Nov. 5, 1946.  A. J. GRACIA  2,410,779
METHOD OF REMOVING INHIBITORS
Filed Aug. 7, 1941
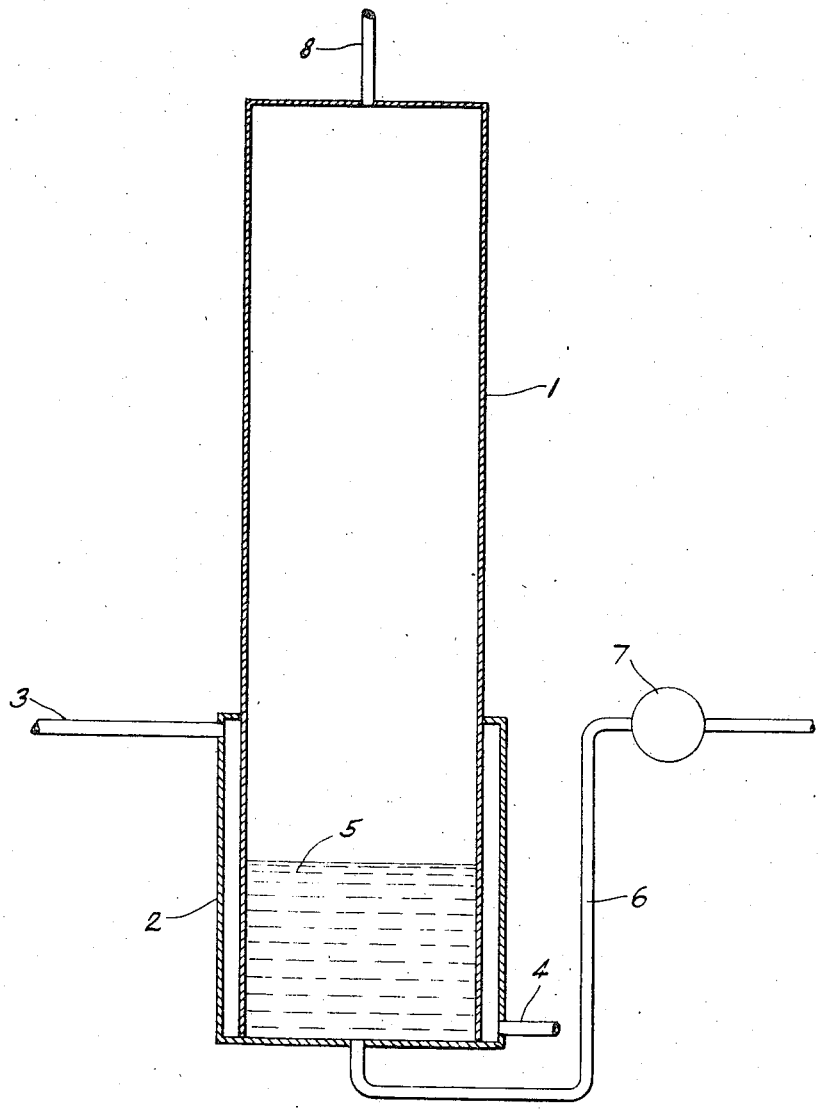
Inventor
Albert J. Gracia Patented Nov. 5, 1946

2,410,779

UNITED STATES PATENT OFFICE 2,410,779

METHOD OF REMOVING INHIBITORS

Albert J. Gracia, Cuyahoga Falls, Ohio, assignor to Wingfoot Corporation, Akron, Ohio, a corporation of Delaware Application August 7, 1941, Serial No. 405,803

8 Claims. (Cl. 202—39)

This invention relates to an improved method of removing polymerization inhibitors from monomeric substances prior to the employment of the latter in the preparation of polymers. More particularly, the invention relates to the removal of polymerization inhibitors from butadiene, a constituent of many polymers.

It is well known that the substance butadiene enters into the composition of many copolymers, particularly those having rubber-like properties and hence important as substitutes for natural rubber. Monomeric butadiene is a gas at normal temperatures and is customarily stored in large tanks under pressure, where it is maintained in liquid form. Since it possesses the property of self-polymerization, it is necessary to incorporate therein a polymerization inhibitor in order that the substance shall not polymerize during storage. Necessarily, also, this inhibitor must be removed before the butadiene is subjected to polymerizing conditions, otherwise polymerization is prevented or is very slow and any rubber formed will have a low extrusion plasticity indicating a difficultly workable material. Since the butadiene is a gas under normal conditions, it would appear that the butadiene could be readily distilled from the inhibitor, which is usually a solid. However, difficulties are encountered in performing such distillation and it is an object of the present invention to overcome such difficulties.

When the butadiene is distilled from the inhibitor, this inhibitor, such as phenyl beta naphthylamine, concentrates in the undistilled butadiene and gradually builds up until the limit of solubility is reached, whereupon some solid inhibitor is thrown down. Continued distillation then results in sublimation of the inhibitor in the condenser where, of course, it contaminates the distilled butadiene. The presence of water in the still does not overcome this difficulty but, instead, complicates the situation due to the fact that water induces the formation of some small amount of polymerized butadiene. The water does not wet the inhibitor and the solid inhibitor and polymer form a gum which floats at the butadiene-water inter phase and tends to clog up and coat the still boiler.

It has now been found, in accordance with the principles of this invention, that all of these difficulties may be avoided and a clean separation of monomer and inhibitor effected if there is placed in the still a quantity of a high-boiling liquid, such as one of those commonly used as plasticizers. Such a liquid may be any which does not vaporize at the temperatures required to distill the butadiene. The inhibitors usually employed are highly soluble in these "high boilers" and it is found that as much as 50 tons of inhibited butadiene may be distilled through 5 gallons of solvent before renewal is indicated.

Among inhibitor solvents which may be thus employed are the following: dibutyl citrate, dibutyl phthalate, butyl stearate, diethyl phthalate, tributyl phosphate, tricresyl phosphate, and other similar esters often employed as plasticizers in synthetic resins and the like. In general, it may be said that any stable ester having a boiling point between 500 and 700° F. at atmospheric pressure may be employed, the chief requisite being that the solvent shall not be volatile under the conditions of distillation.

The method may be carried out in any suitable apparatus, one such being illustrated in the accompanying drawing in which a boiler 1 is surrounded at its lower end with a steam jacket 2 into which steam is admitted through a pipe 3 and condensate is removed through an outlet 4. In the lower part of the still is a body of high-boiling solvent 5 into which liquid butadiene is conducted through a line 6, the flow being controlled by means of a float control 7. The butadiene or other monomer is admitted at the bottom of the still and bubbles up through the solvent body 5 where it loses its inhibitor content. The vapors of the purified monomer are then led off through the duct 8 to a condenser.

When the butadiene or other monomer contains phenyl beta naphthylamine as inhibitor, and at present this is the substance most widely employed as a polymerization inhibitor, tests of the distilled material by means of ultra violet light show almost no fluorescence when the present method is employed. Fluorescence under ultra violet light is an extremely sensitive test for phenyl beta naphthylamine. Butadiene distilled without the aid of a solvent or in the presence of water shows pronounced fluorescence in the condenser, thus indicating that the distillation was entirely ineffective for the purpose indicated, namely, to remove inhibitor prior to polymerization of the butadene.

As will be apparent, the method is also applicable to the distillation of other normally gaseous monomeric materials intended for use in polymerizations, such as vinyl chloride, the solvent employed being selected so as to have a boiling point well above the temperature necessary to effect distillation of the particular monomer under treatment.

While there has been described above a preferred embodiment of the invention, it will be apparent to those skilled in the art that various modifications and changes may be made therein without departing from the spirit of the invention or from the scope of the appended claims.

I claim:

1. A method of removing a polymerization inhibitor from a normally gaseous monomeric substance which comprises bubbling the monomer containing the inhibitor up through a body of high-boiling solvent for said inhibitor, leading off the vapors of the purified monomeric substance from the surface of the body of liquid and condensing the vapors.

2. A method of removing a polymerization inhibitor from a normally gaseous monomeric substance which comprises bubbling the monomer containing the inhibitor up through a heated body of high-boiling solvent for said inhibitor to dissolve substantially all of the inhibitor therefrom, leading off the vapors of the purified monomeric substance from the surface of the body of liquid and condensing the vapors.

3. A method of removing a normally solid polymerization inhibitor from a normally gaseous monomeric substance which comprises bubbling the monomer containing the inhibitor up through a body of high-boiling solvent for said inhibitor to dissolve substantially all the inhibitor therefrom, leading off the vapors of the purified monomeric substance from the surface of the body of liquid and condensing the vapors.

4. A method of removing a normally solid polymerization inhibitor from butadiene which comprises bubbling the butadiene containing the inhibitor up through a body of high-boiling solvent for said inhibitor to dissolve substantially all of the inhibitor out of the butadiene, leading off the vapors of the purified butadiene from the surface of the body of liquid and condensing the vapors.

5. A method of removing substantially all phenyl beta naphthylamine from butadiene which comprises bubbling the butadiene containing the phenyl beta naphthylamine up through a body of high-boiling solvent for the phenyl beta naphthylamine to dissolve substantially all of the latter from the butadiene, leading off the vapors of the purified butadiene from the surface of the body of liquid and condensing the vapors.

6. A method of removing a normally solid polymerization inhibitor from butadiene which comprises bubbling the butadiene containing the inhibitor up through a body of liquid dibutyl citrate to remove substantially all of the inhibitor from the butadiene, leading off the vapors of the purified butadiene from the surface of the body of dibutyl citrate and condensing the vapors.

7. A method of removing a normally solid polymerization inhibitor from butadiene which comprises bubbling the butadiene containing the inhibitor up through a body of liquid dibutyl phthalate to remove substantially all of the inhibitor from the butadiene, leading off the vapors of the purified butadiene from the surface of the body of dibutyl phthalate and condensing the vapors.

8. A method of removing a normally solid polymerization inhibitor from butadiene which comprises bubbling the butadiene containing the inhibitor up through a body of liquid tricresyl phosphate to remove substantially all of the inhibitor from the butadiene, leading off the vapors of the purified butadiene from the surface of the body of tricresyl phosphate and condensing the vapors.

ALBERT J. GRACIA.